United States Patent [19]

Cohn

[11] 4,388,502
[45] Jun. 14, 1983

[54] ADAPTER FOR MOUNTING A MICROPHONE FLUSH WITH THE EXTERNAL SURFACE OF THE SKIN OF A PRESSURIZED AIRCRAFT

[75] Inventor: Robert B. Cohn, Lancaster, Calif.

[73] Assignee: The United States of America as represented by the Administrator of the National Aeronautics and Space Administration, Washington, D.C.

[21] Appl. No.: 330,613

[22] Filed: Dec. 14, 1981

[51] Int. Cl.³ .............................................. H04R 1/02
[52] U.S. Cl. ................................. 179/179; 179/146 R; 367/906
[58] Field of Search .................. 179/146 R, 179, 184; 367/188, 157, 906

[56] References Cited

U.S. PATENT DOCUMENTS

| 1,187,127 | 6/1916 | Berger . | |
|---|---|---|---|
| 1,380,869 | 6/1921 | Fay . | |
| 1,735,460 | 11/1929 | Hahnemann et al. . | |
| 2,016,906 | 10/1935 | Rice . | |
| 2,167,412 | 7/1939 | Baesecke . | |
| 3,352,157 | 11/1967 | Seegmiller . | |
| 3,476,208 | 11/1969 | Sellman et al. ...................... | 181/145 |
| 3,484,741 | 12/1969 | Hyman ................................ | 367/906 |
| 3,521,492 | 7/1970 | Baltakis .............................. | 73/754 |
| 3,692,264 | 9/1972 | Burkhard .......................... | 179/146 R |
| 3,766,333 | 10/1973 | Watson ............................ | 179/146 R |
| 4,028,504 | 6/1977 | Massa ................................ | 179/146 R |
| 4,199,667 | 4/1980 | Renner ................................ | 179/179 |

FOREIGN PATENT DOCUMENTS 2021267  11/1979  United Kingdom ................ 367/906

Primary Examiner—G. Z. Rubinson
Assistant Examiner—L. C. Schroeder
Attorney, Agent, or Firm—Darrell G. Brekke; John R. Manning

[57] ABSTRACT

A mounting device 10 for securing a microphone pick-up head 12 flush with respect to the external surfaces of the skin 14 of an aircraft A for detecting shock waves passing thereover. The mount includes a sleeve 30 mounted internally of the aircraft for capturing and supporting an electronics package having the microphone pick-up head attached thereto in a manner such that the head 12 is flush with the external surface of the aircraft skin and a pressure seal is established between the internal and external surfaces of the aircraft skin.

7 Claims, 6 Drawing Figures

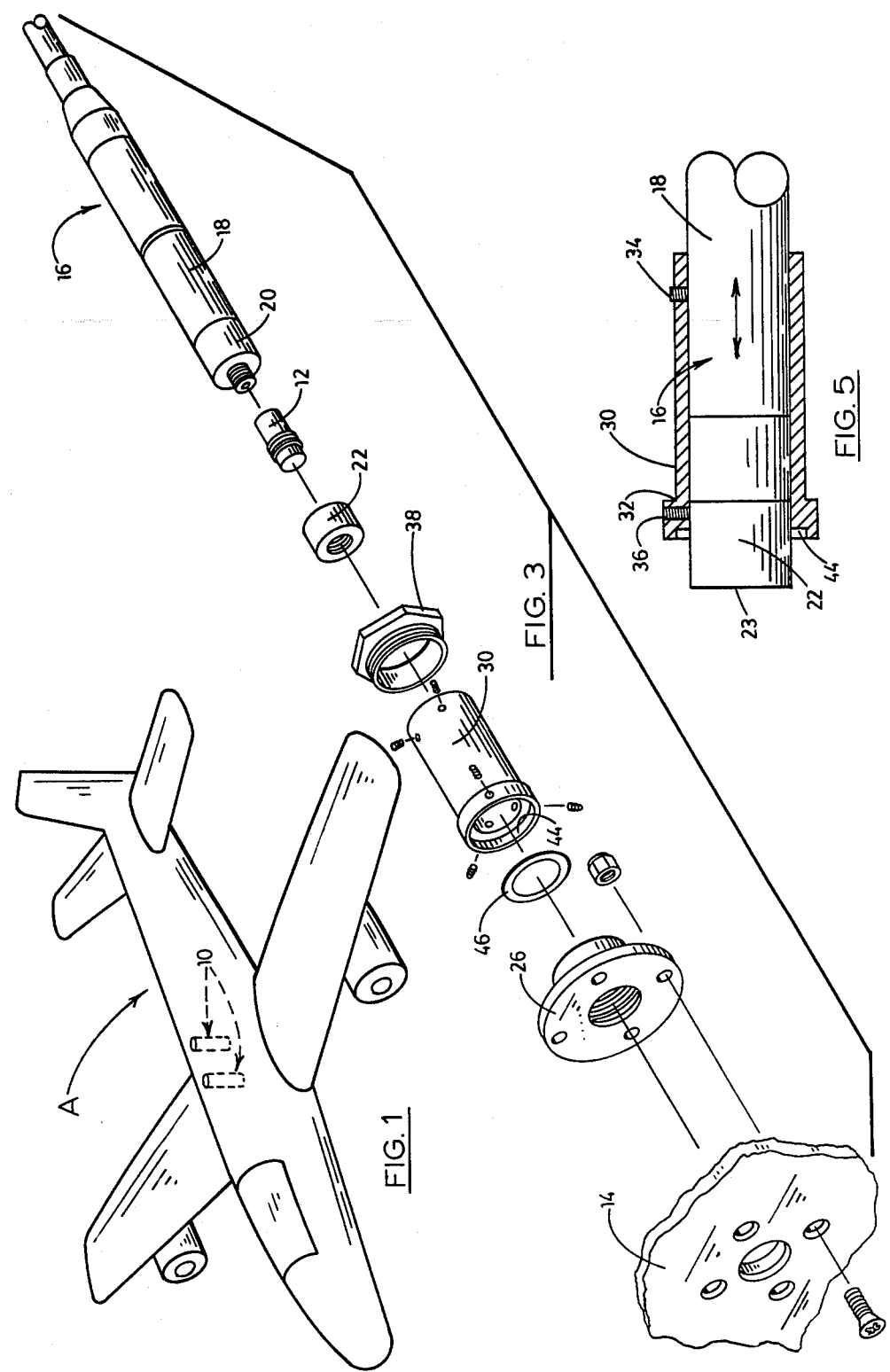

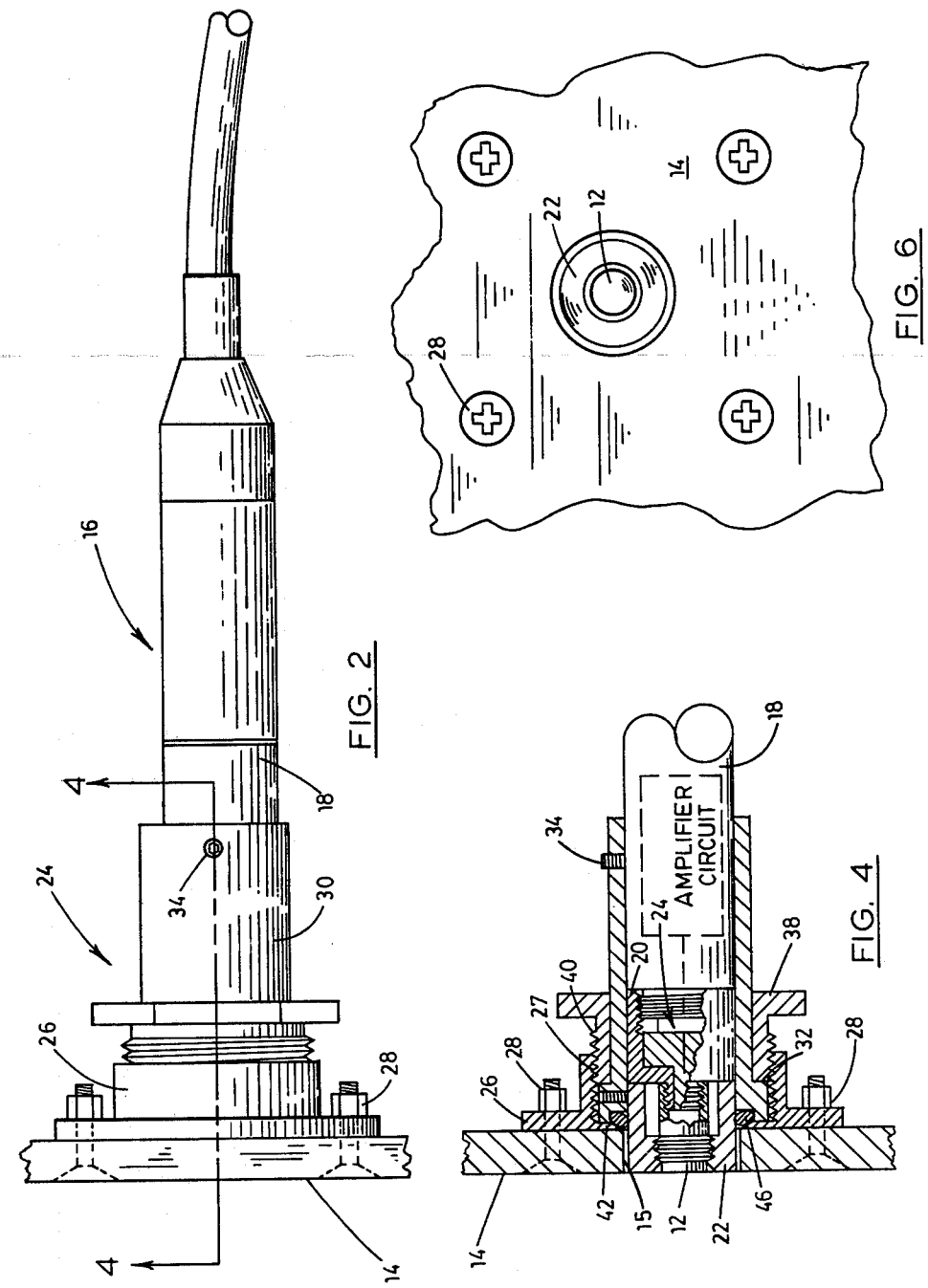

4,388,502

ADAPTER FOR MOUNTING A MICROPHONE FLUSH WITH THE EXTERNAL SURFACE OF THE SKIN OF A PRESSURIZED AIRCRAFT

ORIGIN OF THE INVENTION

The invention described herein was made in the performance of work by an employee of the U.S. Government and may be manufactured and used by or for the Government for Governmental purposes without the payment of any royalties thereon or therefor.

BACKGROUND OF THE INVENTION

1. Field of the Invention

The invention generally relates to a device to be used in mounting microphones for detecting shock waves as they pass over the surface of an aircraft fuselage, wing, or the like, and more particularly to a device for mounting a microphone pick-up head 12 flush with respect to the external surface of the skin 14 of an aircraft A for detecting shock waves as they pass thereover.

As can be fully appreciated by those involved in conducting research related to boundary tests for detecting turbulent flow of air over the external surfaces of aircraft, much difficulty has been encountered in utilizing conventional mountings for microphone pick-up heads. For example, heretofore probe-type microphone pick-up heads mounted in foam blocks to eliminate vibrations, have been employed. However, such devices simply have not met existing needs because they tend to produce vibration-induced, spurious and unwanted signals which can be greater than the measured noise, whereby meaningful date is distorted.

2. Description of the Prior Art

A search conducted for the instant invention uncovered the patents listed on the enclosed Form PTO-1449.

It is believed that the most pertinent reference discovered during the course of the search is the patent to Baltakis U.S. Pat. No. 3,521,492, which discloses a substantially flush mounted pressure gauge for sensing the pressure of fluid pressure pulses. The patented device includes a piezoelectric crystal 12 mounted beneath a flush layer of cement and is bonded to a metal rod. An output lead is connected to the rod for transmitting a signal from the pressure gauge which varies in accordance with pressure changes occuring in the crystal. However, it is important to note that the patent fails to disclose a simplified device for mounting a microphone pick-up head flush with the external skin of aircraft, which is capable of substantially eliminating vibration-induced noises.

It is therefore the general purpose of the instant invention to provide an improved mounting device for mounting a microphone pick-up head flush with the external surface of the skin of an aircraft, the mounting device being adapted to create a pressure seal through the skin of the aircraft.

OBJECTS AND SUMMARY OF THE INVENTION

It is an object of the invention to provide an improved mounting device for a microphone pick-up head mounted in a flush relationship with the external surface of the skin of an aircraft.

It is another object to provide a mounting device for a microphone pick-up head adapted to support the pick-up head in flush relationship with the external skin of the aircraft while maintaining a pressure seal about the device as it extends through the skin.

It is another object to provide a simplified mounting device for mounting a microphone pick-up head flush with the external skin of an aircraft which is simple to construct and is readily adaptable for installation.

These and other objects and advantages are achieved through a mounting device including adjustable coupling members for securing a microphone pick-up head flush with respect to the external surfaces of the skin of an aircraft for detecting shock waves passing thereover while a pressure seal is established between the internal and external surfaces of the aircraft skin.

DESCRIPTION OF THE DRAWINGS

FIG. 1 is a schematic view of an aircraft for depicting an operational environment for the mounting device of the instant invention.

FIG. 2 is an enlarged view illustrating the mounting device.

FIG. 3 is an exploded view of the mounting device.

FIG. 4 is a cross-sectional view taken generally along lines 4—4 of FIG. 2.

FIG. 5 is a partially sectioned view depicting one manner in which the device of the instant invention may be longitudinally adjusted for assuring the establishment of a flush relationship between a microphone pick-up head, supported by the mounting device, and the external surface of the skin of an aircraft.

FIG. 6 is an end view depicting a flush relationship established between the microphone pick-up head and the external surface of the skin of an aircraft.

DESCRIPTION OF THE PREFERRED EMBODIMENT

Referring now to the drawings, with more particularity, wherein like reference characters designate like or corresponding parts throughout the several views, there is shown in FIG. 1 an aircraft, generally designated A, having mounted therein a pair of mounting devices, each being designated 10, embodying the principles of the instant invention. It will be appreciated that the mounting devices 10, as shown in FIG. 1, are not drawn to scale.

Each of the mounting devices 10 serves to mount a microphone pick-up head 12, FIG. 6, in a flush relation with the external surface of skin 14 for the aircraft A. A bore 15 is provided for receiving the pick-up head, as will hereinafter become apparent. The pick-up head currently employed comprises a condensor mike obtainable from B & K Instruments. The details of the electronics circuits employed form no part of the claimed invention.

The microphone pick-up head 12 and an associated amplifier circuit are shown mounted in a conventional housing 16. The pick-up head and amplifier circuit are of well known design, the details of which form no part of the claimed invention. However, it is to be understood that the housing 16 includes a base portion 18, an intermediate portion 20, FIG. 3, a distal portion, which includes the pick-up head 12, and a cap 22 therefor.

As best illustrated in FIGS. 2 and 4, the intermediate portion 20 is connected to the base portion 18 by screw threads, not designated, while the pick-up head 12 is connected with the intermediate portion 20 by screw threads, also not designated, and to the cap or distal portion 22 by threads, also not designated. It is to be understood that suitable pin and lead connections, generally designated 24 are provided for coupling the pick-up head 12 with an amplifier circuit, FIG. 4, mounted in conventional manner within the base portion 18 of the housing 16. Accordingly, it should now be apparent that the housing 16, as illustrated in FIG. 5, comprises a fully integrated unit within which both the microphone pick-up head 12 and the amplifier circuit are suitably supported and conventionally connected.

The housing 16 is supported by a mounting device, generally designated 24 which serve to couple the housing 16 to the internal surface of the skin 14, as best shown in FIG. 2, while establishing a flush relationship between the external surfaces of the skin 14 and the endmost surface of the microphone pick-up head 12.

The mounting device herein disclosed includes an internally facing cup 26, FIG. 3. The cup 26 includes internal threads 27 and is connected with the internal surface of the skin 14 through suitable fasteners including screws and nut combinations, designated 28.

Telescopically received about the housing 16 there is a mounting sleeve 30 having an annular shoulder 32 disposed near its distal end. As best shown in FIG. 5, the sleeve 30 is connected with the housing 16 by means of a plurality of set screws 34 and 36. The set screws 34 and 36 are threaded and extend through threaded bores formed in the sleeve 30 and engage the housing 16 for fastening the housing 16 to the sleeve 30 whereby axial motion therebetween is precluded. It should be apparent that upon release of the set screws, the sleeve 30 is axially displaceable relative to the housing 16 for accommodating axial positional adjustment. The purpose of the axial adjustment is for assuring that a flush relationship is established between the distal end of the microphone pick-up head 12 and the external surface of the skin 14, as should hereinafter become apparent.

A lock nut 38 having an internal diameter substantially equal to the external diameter of the mounting sleeve 30 and external threads 40 is received in telescoping relationship with the sleeve 30, as best shown in FIG. 4. The external threads 40, in practice, mate with the internal threads 27 of the cup 26, whereby the lock nut 38 may be driven into seated relationship with the shoulder 32 formed on the sleeve 30 for seating the distal end of the sleeve on an annular lip 42, integral with the cup 26, having an internal diameter substantially equal to the diameter of the bore 15. Thus the sleeve 30 is seated against the cup 26, rather than against the internal surface of the skin 14.

Preferably, the distal end of the sleeve 30 is provided with an annular O-ring groove 44 having an O-ring 46 seated therein for establishing a pressure seal about the housing 16, circumscribing the bore 15, whereby a pressure differential may be established and maintained between the internal and external surfaces of the skin.

OPERATION

In order to mount the device 10 in a manner such that the distal end surface of the microphone pick-up head 12 is flush with the external surface of the skin 14 of the aircraft A, the housing 16 is assembled with the distal surface of the pick-up head 12 arranged in co-planar or flush relation with the distal surface of the distal portion of the housing 16. It will be understood that the housing 16 is now assembled in a fully integrated configuration.

The mounting sleeve 30 is now received in telescopic relation with the housing 16 and the set screws 34 and 26 tightened for fixing the sleeve in a fixed relationship with the housing. It is to be assumed that the lock nut 38 is positioned to be received in a telescopic relationship with the sleeve 30. The housing, with the O-ring 46 seated in the O-ring groove 44 is now inserted into the bore 15 a distance such that the external surfaces of the distal portion 22 thereof and the distal surface of the pick-up head 12 is in flush relationship with the external surface 14 of the aircraft A. The lock nut 38 is now tightened for causing the external thread 40 of the lock nut 38 to advance along the internal thread 27 for the cup 26. Thus the sleeve 30 is caused to seat on the annular lip 42, while simultaneously crushing the O-ring 46 in order to establish a pressure seal between the external and internal surfaces of the skin 14 at the bore 15. In the event the external surfaces 23, and consequently the distal surface of the pick-up head 12, are not in a flush relationship with the external surface of the skin, after initial assembly, it is a simple matter to release the lock nut 38 and adjust the sleeve 30 relative to the housing 16 and thereafter tighten the set screws 34 and 36. The housing is reinserted into the bore 15, the sleeve and the housing reinserted into the cup 26 and the sleeve 30 driven into seated relationship with the annular lip 42 for establishing the aforementioned pressure seal about the distal end portion 22 of the housing 16.

It is believed that in view of the foregoing, it is readily apparent that the mounting device 10 embodying the principles of the instant invention provide a satisfactory solution to the problems heretofore encountered by those engaged in a measuring of shock waves utilizing sonic transducers, such as microphone heads and the like.

What is claimed is:

1. In a mounting device for mounting a sonic transducer comprising a microphone pick-up head flush with respect to the external surface of the skin of an aircraft for detecting shock waves passing thereover, the improvement comprising:

A. a segmented, cylindrical body defining a housing for an electronic package having a base segment and a distal segment characterized by a substantially planar end surface and including a concentric aperture, an amplifier circuit and a microphone pick-up head confined within said housing, said pick-up head being projected into said aperture and characterized by a planar end surface arranged in coplanar relation with the end surface of said cylindrical housing; and B. mounting means for securing said housing within a pressurized compartment for an aircraft with the planar end surface of said housing disposed in coplanar relation with the external surface of the skin of the aircraft, said mounting means including a mounting sleeve having an internal surface of a cylindrical configuration for receiving said housing in adjustable, telescopic relation, means for securing said sleeve in fixed relation with said housing, and means for affixing said sleeve to the internal surface of the skin of an aircraft.

2. The improvement as defined in claim 1 wherein the mounting means further includes sealing means for establishing a pressure seal between the inner and outer surfaces of the skin of the aircraft.

3. The improvement as defined in claim 2 wherein the sealing means comprises an O-ring seal circumscribing the distal end of said housing.

4. An improvement as defined in claim 1 wherein said means for affixing said sleeve to the internal surface of the skin of the aircraft includes:

A. means defining an internally threaded receiver affixed to the skin of the aircraft for receiving said mounting sleeve;

B. an annular shoulder defined about one end of said mounting sleeve adjacent the distal end segment of said housing; and C. an externally threaded stop-nut for securing said mounting sleeve in fixed relation with said internally threaded receiver, said stop-nut being telescopically related to said mounting sleeve, seated on said shoulder, and threadably connected to said receiver.

5. An improvement as defined in claim 1 wherein said mounting sleeve serves as means for adjusting the position of said distal end segment of said housing with respect to the external surface of the skin of the aircraft.

6. An improvement as defined in claim 1 wherein said pick-up head is threaded into the distal end of said housing.

7. A mounting device for mounting a pick-up head for a sonic transducer in substantial coplanar relation with the external surface of the skin of a pressurized aircraft, comprising:

A. a segmented, cylindrical housing for an electronic package, said housing being characterized by a base segment, an intermediate segment threadably received at one end of said base segment and a distal segment threadably received in abutted relation with said intermediate section, said base segment having mounted therein a signal amplifying circuit, said intermediate section being provided with a signal conductor and an externally threaded mount projected axially therefrom, and said distal segment being characterized by a planar surface and provided with a concentric threaded bore, a microphone threadably inserted into said bore and having a planar end surface projected through the bore into coplanar relation with the planar end surface of the distal segment of said housing including an internally threaded socket for receiving said mount in threaded relation therewith; and B. mounting means for securing said segmented housing within a pressurized compartment of an aircraft with the planar end surface of said distal segment of the housing being in coplanar relation with the external surface of the skin of the aircraft, comprising a mounting sleeve receiving said housing in telescopic relation, said mounting sleeve being provided with an annular shoulder circumscribing one end thereof and arranged in circumscribing relation with the distal end of said segmented housing and characterized by an internal O-ring groove having an O-ring seated therein, at least one set screw extended radially through said shoulder for securing said distal segment of said housing to said mounting sleeve, and at least one set screw extended radially through said sleeve in spaced relation with said shoulder for connecting the base segment of the housing to the sleeve, a receiver for supporting said housing mounted on the internal surface of the skin of said aircraft comprising an internally threaded inwardly facing cup being characterized by a concentric aperture aligned with an aperture formed in the skin of said aircraft, the diameters of said apertures being slightly greater than the diameter of the distal segment of said housing, whereby the distal segment of the housing may be inserted through said apertures, said cup being further characterized by an internal annular base circumscribing the concentric aperture and receiving said O-ring in an hermetically sealed relationship, and an externally threaded stop-nut circumscribing said housing, seated on the shoulder of said sleeve and threadably engaged with the internal threads of said cup.

* * * * *